United States Patent [19]

Aldridge et al.

[11] Patent Number: 5,136,723

[45] Date of Patent: Aug. 11, 1992

[54] FIREFIGHTER GARMENT WITH MESH LINER

[75] Inventors: Donald Aldridge, New Carlisle; Jeffrey G. Morris, Dayton, both of Ohio

[73] Assignee: Lion Apparel, Inc., Dayton, Ohio

[21] Appl. No.: 656,542

[22] Filed: Feb. 15, 1991

[51] Int. Cl.⁵ ............................................. A41D 13/00
[52] U.S. Cl. .................................................. 2/81; 2/87; 2/97
[58] Field of Search ...................... 2/81, 82, 85, 86, 87, 2/93, 97

[56] References Cited

U.S. PATENT DOCUMENTS

| | | | |
|---|---|---|---|
| 1,015,231 | 1/1916 | Jacobs . | |
| 1,092,105 | 3/1914 | Holmes . | |
| 1,485,392 | 5/1922 | Halek . | |
| 2,114,514 | 4/1937 | York | 2/93 |
| 2,771,661 | 10/1953 | Foster | 28/80 |
| 2,976,539 | 3/1961 | Brown | 2/97 |
| 3,219,514 | 11/1965 | De Roysancour | 2/97 |
| 3,251,727 | 5/1966 | Reynolds et al. | 161/148 |
| 3,710,395 | 1/1973 | Spano | 2/81 |
| 4,034,417 | 7/1977 | Ellis | 2/82 |
| 4,194,041 | 3/1980 | Gore | 2/87 |
| 4,195,364 | 4/1980 | Bengtsson | 2/81 |
| 4,500,593 | 2/1985 | Weber | 428/257 |
| 4,583,247 | 4/1986 | Fingerhut | 2/81 |
| 4,667,344 | 5/1987 | Cooper | 2/79 |
| 4,685,155 | 8/1987 | Fingerhut | 2/87 |
| 4,716,594 | 1/1988 | Shannon | 2/4 |
| 4,843,646 | 4/1989 | Grilliot et al. | 2/69 |
| 4,897,886 | 2/1990 | Grilliot et al. | 2/81 |
| 5,001,783 | 3/1991 | Grilliot et al. | 2/81 |
| 5,007,112 | 4/1991 | Lewis | 2/79 |
| 5,014,363 | 5/1991 | Hubner | 2/87 |

FOREIGN PATENT DOCUMENTS 220799 3/1957 Australia .................... 2/87

Primary Examiner—Werner H. Schroeder
Assistant Examiner—Diana L. Biefeld
Attorney, Agent, or Firm—Thompson, Hine and Flory

[57] ABSTRACT

A firefighter garment comprises an outer shell made of a flame-resistant material, a moisture barrier positioned within the shell and an inner thermal barrier layer positioned within the shell and including at least one layer of a mesh fabric. The mesh fabric creates a layer of air between the wearer and the outer shell sufficient to protect the wearer from a high temperature external heat source and yet promotes heat and perspiration vapor transfer from the wearer's body. In a preferred embodiment, the inner thermal barrier layer includes two layers of mesh material, the material having between 8 and 16 holes per inch, quilted to a facecloth material which is located facing the wearer's body.

18 Claims, 2 Drawing Sheets

FIREFIGHTER GARMENT WITH MESH LINER

BACKGROUND OF THE INVENTION

The present invention relates to firefighter garments and, more particularly, to firefighter garments having discrete, multiple layers of material.

The National Fire Protection Association (NFPA) requires that firefighter garments must meet certain specific standards. As a minimum requirement, the garment must include an outer shell made of a flame-resistant material which preferably resists punctures and abrasion as well, an intermediate moisture barrier layer and an inner, thermal layer for protecting the wearer against external high-temperature extremes encountered during firefighting activities. Typically, the outer shell is made of a single layer of a tightly woven aramid material such as NOMEX III, KEVLAR ("NOMEX III" and "KEVLAR" are registered trademarks of E.I. DuPont de Nemours & Co., Inc.) or PBI ("PBI" is a registered trademark of Celanese Corp.).

The moisture barrier typically comprises a substrate of NOMEX, a blend of NOMEX and KEVLAR or a blend of polyester and cotton with a coating of flame retardant neoprene or GORE-TEX film ("GORE-TEX" is a registered trademark of W.L. Gore & Associates, Inc.). The thermal barrier layer typically comprises a light weight (3-3.5 ounce) facecloth of NOMEX quilted to a batting of aramid fibers or to layers of nonwoven, spunlaced material felt made up of NOMEX and KEVLAR fibers. The outer shell provides a flame-resistant covering for the garment, the moisture barrier prevents the wearer from becoming wet as a result of external moisture from fire hoses, sprinklers, and the like, and from steam burns and the inner thermal layer provides protection from external heat sources.

One problem inherent with many firefighter garments is that, while the three layers of material protect the wearer from external sources of flame, heat and moisture, they also act to retain the heat and perspiration moisture generated by the wearer. Such heat and moisture buildup can be considerable in the firefighting environment, in which the wearer is required to wear heavy clothing, carry people and heavy equipment, and climb stairs. As a result of such physical exertion, the core body temperature of the wearer of firefighter garments increases since thermal escape by radiation from the skin surface of the wearer and heat transport from evaporation of perspiration is reduced by the thermal layer. The latter problem is a result of the insulating effect of the thermal barrier layer, which tends to trap perspiration moisture and hold it close to the skin of the wearer. An increase of only a few degrees in body core temperature can significantly reduce the strength and endurance of a firefighter in the often hostile firefighting environment.

Attempts have been made to reduce the buildup of heat during strenuous firefighter activities. For example, Grilliot et al. U.S. Pat. No. 4,897,886 discloses a firefighter garment having an outer shell, a moisture barrier layer and an inner thermal layer. The inner thermal layer and moisture barrier are separated by a spacer element to maintain a "dead air space" between those layers of the garment. The dead air space prevents circulation of air between the inner and intermediate layers. In one embodiment, the spacer element comprises elongate channels which are oriented vertically on the garment so that heat entering the air space flows upwardly to exit the top of the garment through a porous inner layer.

Accordingly, there is a need for a firefighter garment which is lightweight, allows for escape of heat and perspiration vapor from the wearer, yet provides the requisite protection from external sources of flame, heat and moisture.

SUMMARY OF THE INVENTION

The present invention is a firefighter garment having an outer shell, a moisture barrier positioned within the shell and an inner thermal barrier layer positioned within the shell and including at least one layer of a mesh fabric, whereby the mesh fabric creates a layer of air sufficient to protect a wearer from high temperature external heat sources, yet promotes heat and perspiration transfer from the wearer's body. Preferably, the inner thermal barrier layer includes two layers of mesh fabric attached at their peripheries to the moisture barrier. The mesh fabric provides an insulating air layer which protects the wearer from external sources of heat, yet the apertures of the mesh promote the passage of perspiration moisture vapor from the wearer to the moisture barrier. In the preferred embodiment, the moisture barrier is a semi-permeable membrane which prevents passage of liquid moisture but allows passage of moisture vapor.

Also in the preferred embodiment, the inner thermal barrier layer includes a relatively lightweight facecloth material quilted to the mesh layers, the facecloth facing the wearer's body. The facecloth provides an additional measure of thermal protection from external heat sources, but is not so dense as to obstruct the flow of heat and moisture vapor from the wearer's body.

In an alternate embodiment, the mesh layer comprises a single layer of mesh fabric which is somewhat thicker than a single one of the mesh layers of the preferred embodiment. In another embodiment, the inner thermal barrier layer comprises a layer of perforated felt or batting.

Accordingly, it is an object of the present invention to provide a firefighter garment which is lightweight yet provides protection from external sources of flame, heat and moisture; a firefighter garment in which the inner thermal layer promotes the escape of heat and moisture vapor from the wearer's body; a firefighter garment in which the moisture vapor escaping from the wearer's body is conveyed to and through the moisture barrier; a firefighter garment in which the thermal properties of the inner layer are not reduced in compression areas, such as the shoulders, because the thermal layer is relatively incompressible; and a firefighter garment which is relatively inexpensive and easy to maintain.

Other objects and advantages of the present invention will be apparent from the following description, the accompanying drawing and the appended claims.

DETAILED DESCRIPTION

Figure 1:
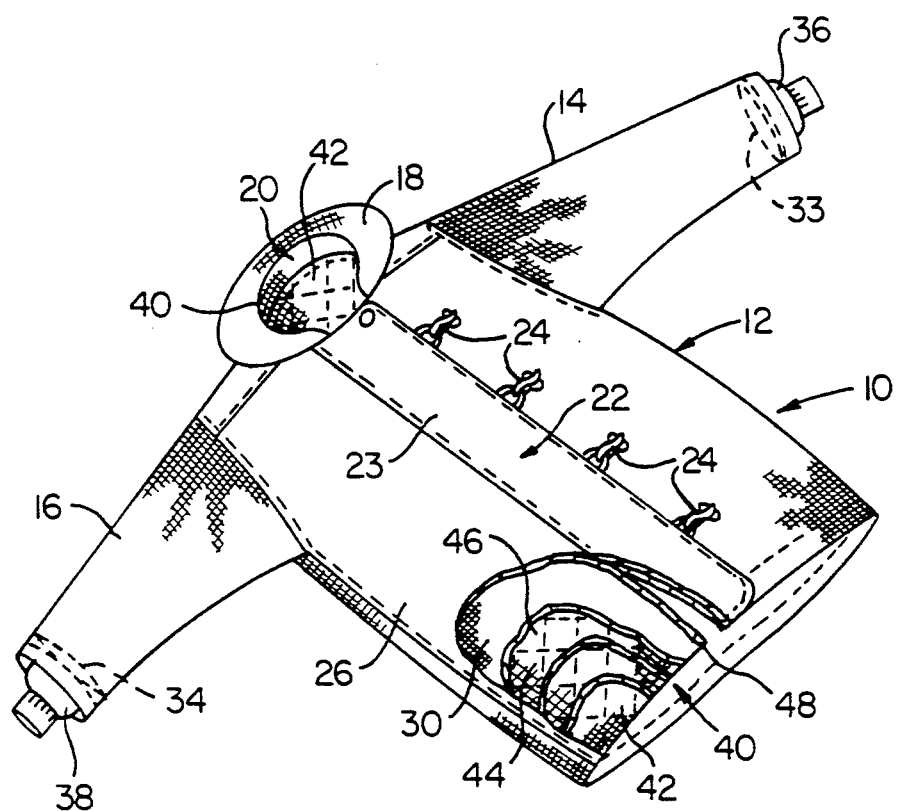
FIG. 1 is a perspective view of a preferred embodiment of a firefighter garment of the present invention, cut away to show the various layers of material.

As shown in FIG. 1, the firefighter garment of the present invention may be in the form of a jacket 10 having a body portion 12, left and right sleeves 14, 16, a collar 18 and a neck opening 20. Alternatively, the garment may be in the form of a firefighter pant or jumpsuit (not shown) and not depart from the scope of the invention. The body portion 12 includes a vertically-oriented front closure 22 of conventional design which includes a slide fastener or hook and loop component (not shown) and a front flap 23 secured by mechanical securement such as buckles 24.

The jacket 10 includes an outer shell, generally designated 26. The outer shell is made of a single layer of a woven aramid fiber such as NOMEX III, KEVLAR, or a blend of KEVLAR and PBI. The outer shell extends over the body portion 12, sleeves 14, 16 and collar 18. The front closure flap 23 which is made of shell material.

Positioned within the shell 26 is an intermediate moisture barrier layer 30. The moisture barrier 30 comprises a substrate 31 of NOMEX or a blend of NOMEX and KEVLAR, laminated with a layer 32 of GORE-TEX. The GORE-TEX layer provides a semipermeable membrane which allows moisture vapor to pass through but blocks liquid moisture. The moisture barrier layer 30 is coextensive with the shell 26 and extends through the arms 14, 16 to terminate at cuffs 33, 34. The shell 26 includes cuff extensions 36, 38, also made of an outer layer of fire-retardant material and an inner layer of moisture barrier material. The combination of the cuff extensions 36, 38 with the moisture barrier layer 30 provides substantially continuous protection for the wearer of the jacket 10 along arms 14, 16.

Figure 2:
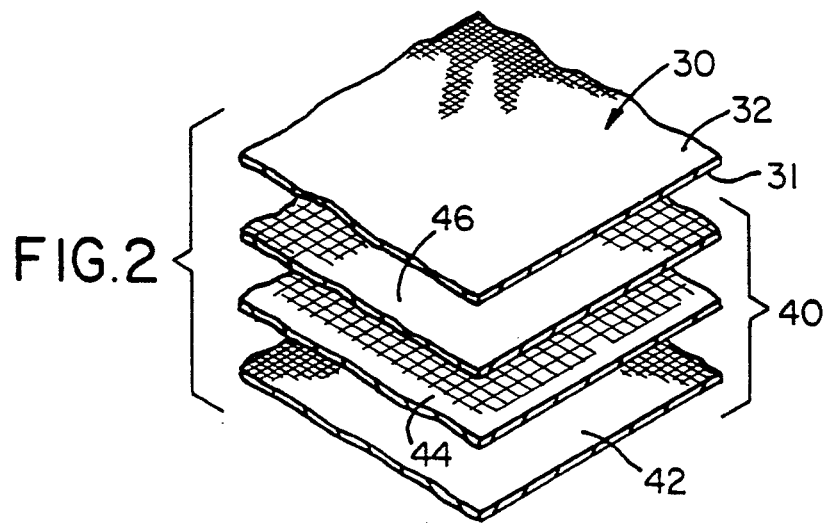
FIG. 2 is a detail exploded perspective view showing the inner layers of material of the garment of FIG. 1.

As shown in FIGS. 1 and 2, the jacket includes an inner thermal barrier 40 which is positioned within the moisture barrier 30 and is substantially coextensive therewith. The thermal barrier 40 includes an outer layer (facing the wearer) of a facecloth 42, made of an aramid fiber such as NOMEX and first and second layers 44, 46 of a mesh fabric. The mesh fabric is made of an aramid fiber such as NOMEX or KEVLAR, and is apertured so that it has approximately 8-16 holes per inch (64 to 256 holes per square inch), with 15 holes per inch being preferred. Each of the mesh layers 44, 46 is made of a lightweight fabric, each having a weight of approximately 2 ounces per yard, compared to the weight of the facecloth 42 of between 3 to 3.5 ounces per yard. It is within the scope of the invention to provide mesh layers 44, 46 either of the same weight or of different weights.

As shown in FIG. 1, the facecloth 42 and mesh layers 44, 46 are quilted together, and the composite is attached to the moisture barrier layer 30 at peripheral hems 48 such as that adjacent to the front closure 22. Other hems (not shown) are positioned at the cuffs 32, 34 and neck opening 20. The moisture barrier 30 and thermal barrier 40 are retained within the shell 26 by well known means such as hook and loop fasteners or snaps (not shown) extending along the front closure 22.

The thermal barrier 40 is capable of meeting NFPA and TFP (Thermal Protective Performance) requirements, including the NFPA 1971 standard. At the same time, the thermal barrier 40 is lighter in weight than conventional thermal barriers which comprise a facecloth quilted to a batting or felt of aramid fibers.

Even more advantageous than the weight reduction aspect of the thermal barrier construction 40 is the improved heat transfer qualities of the thermal barrier. Because of the large aperture size of the mesh layers 44, 46, heat and moisture vapor are conveyed more rapidly away from the wearer of the jacket 10 and moisture vapor flows more rapidly through the semi-permeable membrane of the moisture barrier layer 30 than with prior art garments. The improved heat transfer vapor qualities with respect to prior art thermal barriers which include a batting or felt layer results in part because of the reduced thickness of the thermal barrier 40 and because the thermal barrier of the present invention provides more "open space" between the wearer and the moisture barrier 30, so that moisture vapor from the wearer is not trapped by the fibers of the thermal barrier.

Figure 4:
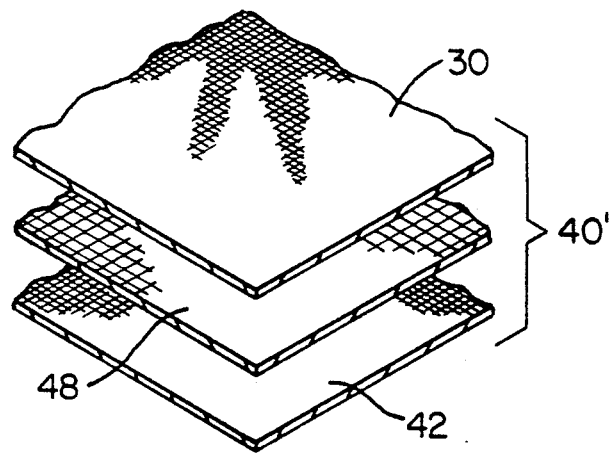
FIG. 4 is a detail exploded perspective view showing the inner layers of material of a second alternate embodiment of the invention.

The result of the construction of the thermal barrier 40 is that the comfort of the jacket is improved since heat stress of the wearer is reduced. As shown in FIG. 4, it is within the scope of the invention to provide thermal barrier 40' comprising a single layer of mesh 48, quilted to the facecloth 42, of a heavier weight than the mesh layers 44, 46. The mesh 48 is positioned between moisture barrier 30 and facecloth 42.

Figure 3:
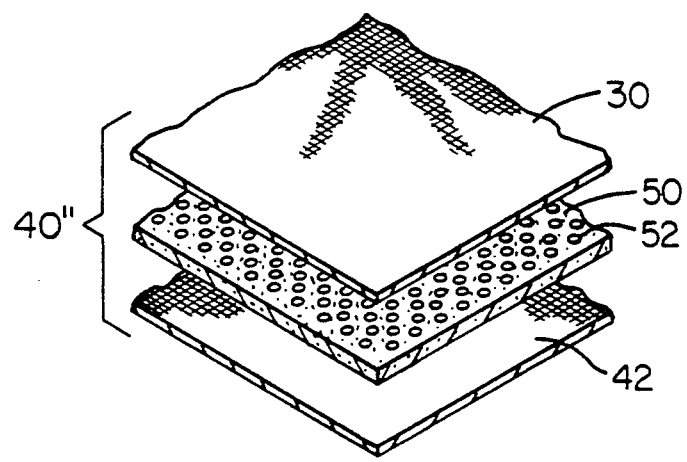
FIG. 3 is a detail exploded perspective view showing the inner layers of material of an alternate embodiment of the invention.

FIG. 3 shows another embodiment of the invention in which the thermal barrier 40' includes a layer 50 of felt or batting is positioned between the moisture barrier layer 30 and facecloth 42. Layer 50 is perforated with holes 52. Preferably, the batting is made of an aramid fiber and the holes 52 have a density of between 8-16 holes per inch.

These embodiments share a common structure; namely, a thermal barrier which offers protection from external heat yet has discrete holes or channels to convey moisture vapor—and therefore heat—from the wearer to the moisture barrier. However, the preferred embodiment includes two mesh layers since, for example, two layers of 2 ounce fabric provide better thermal protection than a single mesh layer of 4 ounce fabric. Accordingly, a two-layer mesh can be lightest in weight while offering the requisite thermal protection.

Another advantage of the thermal barrier 40 of the present invention is that it does not compress easily and therefore retains its thermal characteristics in the weight bearing areas of the jacket 10. These areas include the shoulders and back, which bear the weight of straps and belts for holding equipment such as oxygen tanks.

While the forms of apparatus herein described constitute preferred embodiments of this invention, it is to be understood that the invention is not limited to these precise forms of apparatus, and that changes may be made therein without departing from the scope of the invention.

What is claimed is:

1. A firefighter garment comprising:
   an outer shell;
   a moisture barrier positioned within said shell; and
   an inner thermal barrier layer positioned inwardly of said moisture barrier and consisting essentially of at least one layer of a mesh fabric, whereby said mesh fabric layer creates a layer of air sufficient to protect a wearer from high temperature external heat sources and promotes heat and perspiration transfer from a wearer's body, said layer of mesh fabric providing substantailly an entire insulating function of said inner layer.

2. The garment of claim 1 further comprising a layer of facecloth material attached to an outer face of said mesh fabric against a wearer of said garment.

3. The garment of claim 1 wherein said thermal barrier layer further comprises a second layer of mesh fabric.

4. The garment of claim 1 wherein said moisture barrier is attached to said inner layer.

5. The garment of claim 4 wherein said moisture barrier and thermal layer are removable from said shell.

6. The garment of claim 1 wherein said inner layer is positioned within said moisture barrier.

7. The garment of claim 1 wherein said mesh fabric has between 8 and 16 holes per inch.

8. The garment of claim 1 wherein said mesh fabric has a maximum of 16 holes per inch.

9. The garment of claim 1 wherein said mesh fabric comprises an aramid fiber.

10. The garment of claim 1 wherein said moisture barrier is permeable to water vapor, whereby said mesh promotes flow of perspiration moisture vapor from a wearer to said moisture barrier.

11. The garment of claim 1 wherein said inner thermal barrier layer consists of a single layer of mesh fabric.

12. The garment of claim 1 wherein said mesh fabric consists of a single layer of perforated batting.

13. The garment of claim 12 wherein said batting has between 8 and 16 holes per inch.

14. A firefighter garment comprising:
an outer shell having a single layer of flame resistant, nonapertured aramid material;
a moisture barrier positioned within and being substantially coextensive with said shell, said moisture barrier being permeable to moisture vapor; and
an inner thermal barrier layer positioned within and being substantially coextensive with said moisture barrier, said thermal barrier layer including two layers of mesh made of flame retardant, aramid material having between approximately 8 and approximately 16 holes per inch, and a layer of facecloth quilted to said layers of mesh and positioned between said layers of mesh and a wearer of said garment, said inner thermal barrier layer being attached to said moisture barrier, whereby said moisture barrier and s id thermal barrier layer are removable from within said shell as a single component.

15. A firefighter jacket comprising:
an outer shell made of a flame-resistant material and having a body portion, left and right arms, and neck opening and a front closure;
a moisture barrier positioned within said shell; and
an inner thermal barrier layer positioned inwardly of said moisture barrier and consisting essentially of at least one layer of a mesh fabric, whereby said layer of mesh fabric creates an air space that reduces heat transfer to a wearer from a heat source external to said garment, and promotes heat transfer and transport of moisture vapor from a wearer's body to and through said moisture barrier, said layer of mesh fabric providing substantially an entire insulating function of said inner layer.

16. A firefighter garment comprising:
an outer shell;
a moisture barrier positioned within said shell; and
an inner thermal barrier layer positioned inwardly of said moisture barrier and consisting essentially of first and second layers of a mesh fabric, whereby said mesh fabric creates a layer of air sufficient to protect a wearer from high temperature external heat sources and promotes heat and perspiration transfer from a wearer's body.

17. The garment of claim 16 comprising a layer of facecloth material attached to an outer face of said mesh fabric against a wearer of said garment.

18. The garment of claim 17 wherein said layers of mesh fabric each have a weight of approximately 2 ounces per yard, and said facecloth material has a weight of approximately 3 to 3.5 ounces per yard.

* * * * *